United States Patent
Nagatomi et al.

(10) Patent No.: US 8,023,387 B2
(45) Date of Patent: Sep. 20, 2011

(54) OPTICAL PICKUP DEVICE

(75) Inventors: Kenji Nagatomi, Kaizu (JP); Katsutoshi Hibino, Kaizu (JP)

(73) Assignee: Sanyo Electric Co., Ltd., Osaka (JP)

( * ) Notice: Subject to any disclaimer, the term of this patent is extended or adjusted under 35 U.S.C. 154(b) by 6 days.

(21) Appl. No.: 12/723,088

(22) Filed: Mar. 12, 2010

(65) Prior Publication Data

US 2010/0232282 A1 Sep. 16, 2010

(30) Foreign Application Priority Data

Mar. 12, 2009 (JP) ................................. 2009-060117

(51) Int. Cl.
*G11B 7/00* (2006.01)

(52) U.S. Cl. .................. 369/112.01; 369/44.23; 369/94; 369/112.28; 369/112.06

(58) Field of Classification Search ............... 369/44.23, 369/112.01, 112.06–112.09, 112.23, 112.24, 369/112.28, 94
See application file for complete search history.

(56) References Cited

U.S. PATENT DOCUMENTS

| | | | | |
|---|---|---|---|---|
| 6,442,125 B1* | 8/2002 | Maeda et al. | | 369/44.23 |
| 7,660,226 B2* | 2/2010 | Ogata | | 369/112.18 |
| 2008/0117724 A1* | 5/2008 | Okamoto | | 369/44.24 |
| 2009/0257340 A1* | 10/2009 | Nagata et al. | | 369/121 |
| 2009/0310468 A1* | 12/2009 | Kimura | | 369/112.23 |

FOREIGN PATENT DOCUMENTS

| JP | 2624255 B2 | 4/1997 |
|---|---|---|
| JP | 2006-294075 A | 10/2006 |
| JP | 2006-344344 A | 12/2006 |

* cited by examiner

*Primary Examiner* — Thang Tran
(74) *Attorney, Agent, or Firm* — Ditthavong Mori & Steiner, P.C.

(57) ABSTRACT

An optical pickup device radiates laser light to a disc having a plurality of recording layers in a direction of lamination. The optical pickup device includes an astigmatic element and a spectral element. The astigmatic element allows reflected light from the disc to converge in a first direction and form a first focal line at a first position, and allows reflected light to converge in a second direction and form a second focal line at a second position closer to the disc than the first position. The spectral element splits a reflected light flux in two along a straight line parallel to the first direction and turns traveling directions of the split two light fluxes into directions separated from each other. Here, the spectral element is interposed between the second focal line of the reflected light from a target recording layer and the second focal line of the reflected light from a deeper recording layer than the target recording layer. The photodetector is interposed between the first and second focal lines of the reflected light from the target recording layer.

6 Claims, 11 Drawing Sheets

OPTICAL PICKUP DEVICE

This application claims priority under 35 U.S.C. Section 119 of Japanese Patent Application No. 2009-60117 filed Mar. 12, 2009, entitled "OPTICAL PICKUP DEVICE". The disclosure of the above application is incorporated herein by reference.

BACKGROUND OF THE INVENTION

1. Field of the Invention

The present invention relates to an optical pickup device, and more specifically, is suitable for use in an optical pickup device that records/reproduces information on/from a recording medium in which a plurality of recording layers is laminated.

2. Disclosure of Related Art

In recent years, optical discs have been increasing in capacity. High-capacity optical discs can be realized by arranging a plurality of recording layers in one disc. For example, there are commercialized multiplayer-type disc such as digital versatile discs (DVDs) and Blu-ray discs with two recording layers on one side. Providing three or more recording layers would further increase optical discs in capacity.

However, when a plurality of recording layers is provided in a disc, light reflected from recording layer(s) other than a recording layer as a reproduction target enters into a photodetector to thereby deteriorate reproduction signals. This is a so-called interlayer crosstalk problem due to stray light. Therefore, disposing a plurality of recording layers in one disc requires an arrangement for smoothly suppressing and eliminating stray light.

As a method to eliminate stray light, a pinhole is placed in front of a photodetector, for example. In another stray light eliminating method, front and rear light shield plates are arranged in front of a photodetector. Further, there is another method in which a polarization optical element is employed.

However, under the method with a pinhole in front of a photodetector, both reflected light from a recording layer as a reproduction target and stray light pass through the pinhole and reach the photodetector. In this case, if a space between the recording layers is small, a larger amount of stray light passes through the pinhole and thus interlayer crosstalk cannot be properly eliminated. According to the method with front and rear light shield plates, half of reflected light from a recording layer as a reproduction target is blocked, which reduces usage efficiency of the reflected light to about 50%. Further, the method with a polarization optical element requires a large number of optical components for stray light elimination, thereby resulting in cost increase.

SUMMARY OF THE INVENTION

One aspect of the present invention relates to an optical pickup device that records and/or reproduces information onto and/or from a disc having a plurality of recording layers in a direction of lamination. The optical pickup device in this aspect includes a laser light source; an objective lens that allows light emitted from the laser light source to converge onto the disc; an astigmatic element that allows the laser light reflected by the disc to converge in a first direction and form a first focal line at a first position and allows the laser light to converge in a second direction and form a second focal line at a second position closer to the disc than the first position; a spectral element that splits a flux of the laser light having passed through the astigmatic element in two along a straight line parallel to the first direction, and separates traveling directions of split light fluxes from each other; and a photodetector that receives the laser light having passed through the spectral element. In this arrangement, the spectral element is interposed between the second focal line of the laser light reflected from a target recording layer in the disc and the second focal line of the laser light reflected from a deeper recording layer than the target recording layer. In addition, the photodetector is interposed between the first and second focal lines of the laser light reflected from the target recording layer.

BRIEF DESCRIPTION OF THE DRAWINGS

The foregoing and other objectives and novel features of the present invention will be more fully understood from the following description of preferred embodiments when reference is made to the accompanying drawings.

However, the drawings are only for illustration and are not intended to limit the scope of the present invention.

DESCRIPTION OF PREFERRED EMBODIMENTS

A preferred embodiment of the present invention will be described below with reference to the drawings. This embodi-

Embodiment

Figure 1:
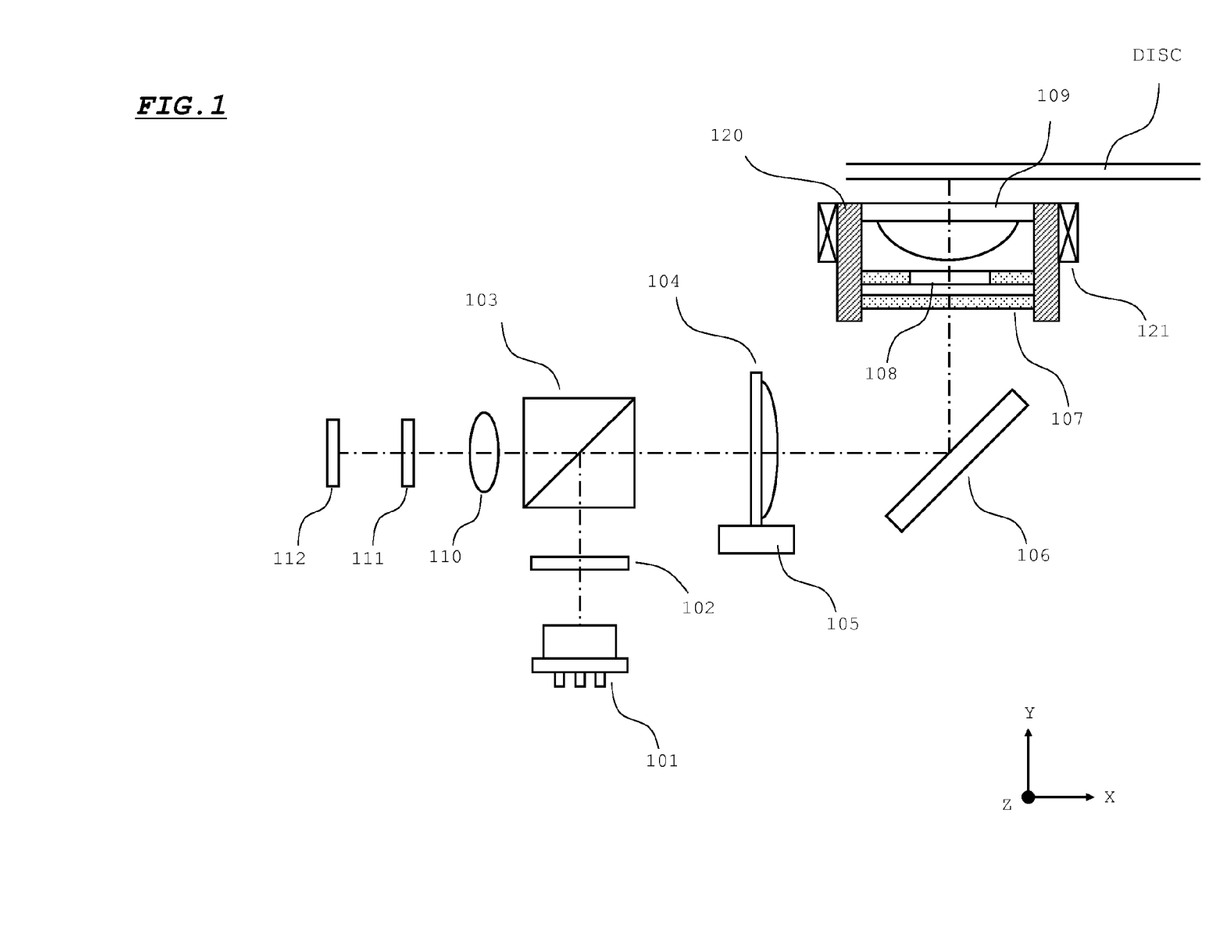
FIG. 1 is a diagram showing an optical system of an optical pickup device in an embodiment of the present invention.

FIG. 1 shows an optical system in the optical pickup device in this embodiment.

A semiconductor laser 101 emits laser light with a predetermined wavelength. A half wavelength plate 102 adjusts the laser light emitted from the semiconductor laser 101 into s-polarized light with respect to a polarized beam splitter (PBS) 103. The PBS 103 reflects almost totally the laser light (s-polarized light) entered from the half wavelength plate 102 and then transmits almost totally the laser light (p-polarized light) entered from a collimator lens 104.

The collimator lens 104 converts the laser light entered from the PBS 103 into parallel light. A lens actuator 105 displaces the collimator lens 104 in a direction of an optical axis so that any spherical aberration on the laser light can be corrected. A standing mirror 106 reflects the laser light entered from the collimator lens 104 in a direction toward an objective lens 109.

A quarter wavelength plate 107 converts the laser light traveling toward a disc into circularly polarized light, and changes a polarization direction of the light reflected from the disc to a vertical direction with respect to a polarization direction of the laser light toward the disc. Accordingly, the laser light reflected from the disc almost totally passes through the PBS 103, and then is guided to an anamorphic lens 110.

An aperture 108 adjusts a beam shape of the laser light to a circle so that an effective diameter of the laser light becomes appropriate to the objective lens 109. The objective lens 109 is designed to allow the laser light to converge onto a target recording layer in the disc. A holder 120 holds the quarter wavelength plate 107, the aperture 108, and the objective lens 109 in an integrated fashion. The objective lens actuator 121 is formed by a conventionally well-known electromagnetically-driven circuit to drive the holder 120 in directions of focusing and tracking.

The laser light applied to the disc is reflected by a recording layer arranged in the disc. The reflected laser light travels backward on the foregoing light path, passes through the PBS 103, and then enters into the anamorphic lens 110. The anamorphic lens 110 allows the reflected light from the disc to converge in a D1 direction and a D2 direction vertical to the D1 direction, thereby introducing astigmatism to the reflected light. Here, the anamorphic lens 110 is placed in such a manner that the D1 and D2 directions are each inclined at 45° to a direction of a track image from the disc. The D1 and D2 directions will be described later with reference to FIGS. 2A to 2D.

The laser light emitted from the anamorphic lens 110 enters into a spectral element 111. The spectral element 111 splits a light flux region of the incident laser light in two and separates the split light flux regions from each other. The spectral element 111 will be described later with reference to FIGS. 2C and 2D.

Figure 4A:
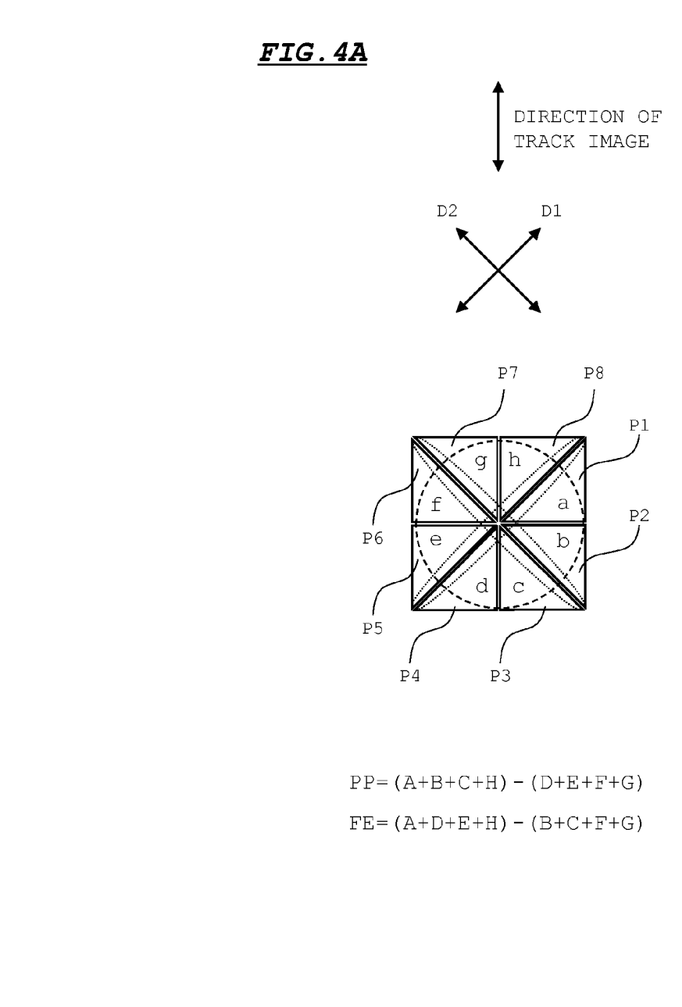
FIG. 4A is a diagram showing a sensor pattern (astigmatic method/1-beam push-pull method) disposed on a light-receiving plane of a conventional photodetector with no spectral element.
Figure 4B:
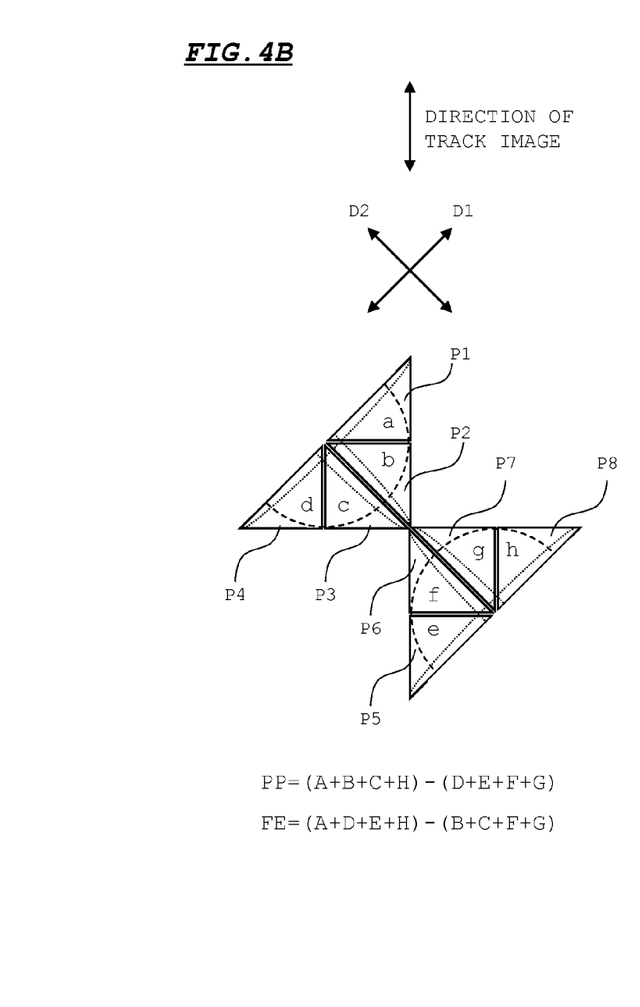
FIG. 4B is a diagram showing a sensor pattern (astigmatic method/1-beam push-pull method) disposed on a light-receiving plane of the photodetector in the embodiment.

A photodetector 112 receives the split laser light emitted from the spectral element 111 and outputs detection signals. The photodetector 112 has eight sensors on a light-receiving plane thereof. Signals output from those sensors are used to generate a focus error signal by the astigmatic method and a tracking error signal by the 1-beam push-pull method. A sensor pattern on the light-receiving plane of the photodetector 112 will be described later with reference to FIG. 4.

Figure 2A:
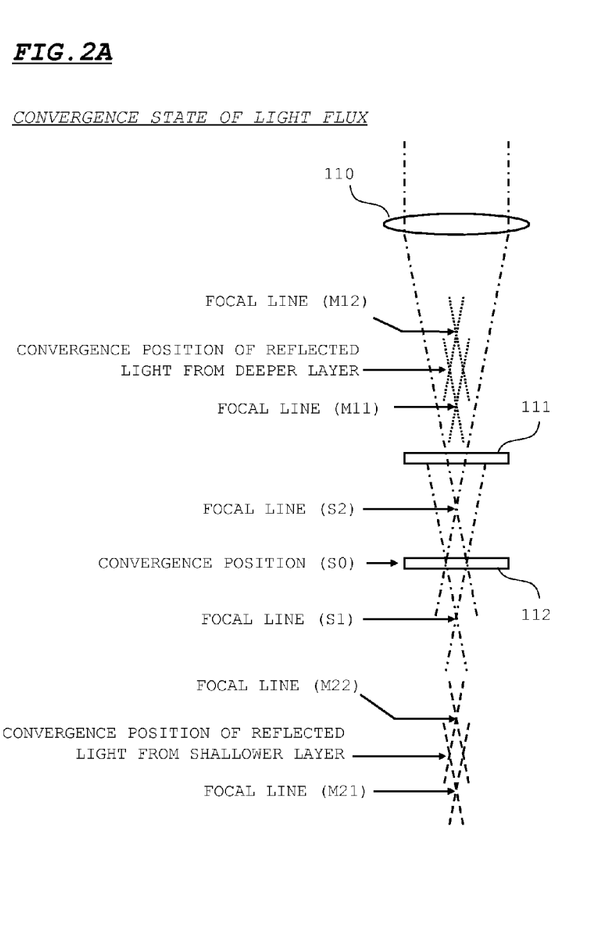
FIG. 2A is a diagram showing states of convergence of light beams on a photodetector and vicinity thereof in the embodiment.
Figure 2B:
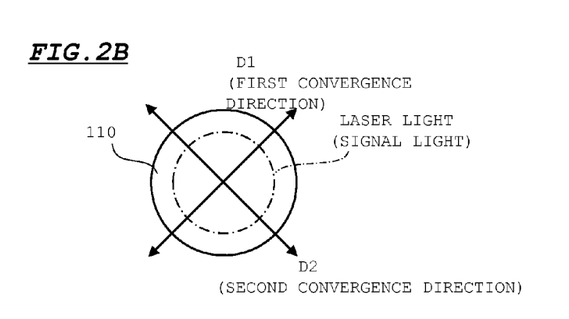
FIGS. 2B and 2D are diagrams showing reflected light (signal light) from a target layer which enters into an anamorphic lens and a spectral element, respectively, and showing relations between the reflected light and those elements, as seen from the light incident side, in the embodiment.
Figure 2C:
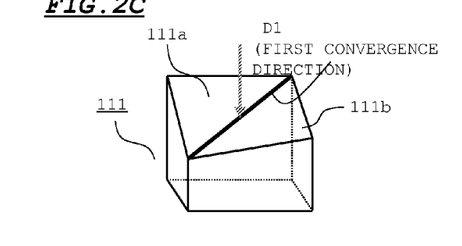
FIG. 2C is a perspective view of a shape of the spectral element in the embodiment.
Figure 2D:
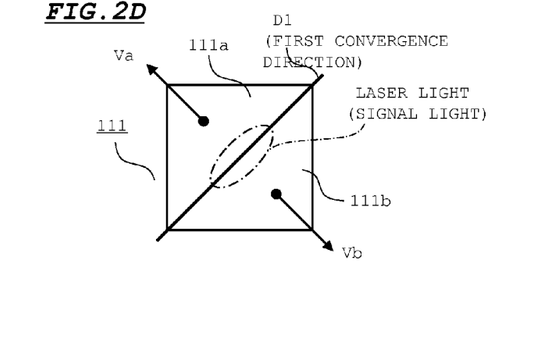

FIG. 2A shows states of convergence of light fluxes on the photodetector 112 and vicinity thereof. FIGS. 2B and 2D show that reflected light (signal light) from the target layer enters into the anamorphic lens 10 and the spectral element 111, respectively, and show relations between the reflected light and those elements. FIG. 2C is a perspective view of a shape of the spectral element 111.

Referring to FIG. 2B, the anamorphic lens 110 allows the incident reflected light to converge in a D1 direction (first convergence direction) and a D2 direction (second convergence direction) vertical to the D1 direction. In addition, the anamorphic lens 110 has a convex shape with a curvature radius smaller in the D2 direction than in the D1 direction, and therefore is more effective in convergence of laser light in the D2 direction as compared with that in the D1 direction. As shown in FIG. 2B, the reflected light (signal light) from the target layer is formed in the shape of a circle by the aperture 108.

Referring to FIG. 2A, the reflected light (signal light) from the target layer, after having been converged by the anamorphic lens 110, forms focal lines at different positions by convergences in the D1 and D2 directions. A focal line position (S1) determined by the convergence in the D1 direction is more distant from the anamorphic lens 110 than a focal line position (S2) determined by the convergence in the D2 direction. A convergence position of the reflected light (signal light) from the target layer (where the beam forms a least circle of confusion) (S0) is an intermediate position between the focal line positions (S1) and (S2) in the D1 and D2 directions.

Similarly, with regard to reflected light from a deeper layer than the target layer with respect to the laser light incident plane, a focal line position (M11) determined by the convergence in the D1 direction is more distant from the anamorphic lens 110 than a focal line position (M12) determined by the convergence in the D2 direction. In addition, the anamorphic lens 110 is designed such that the focal line position (M11) determined by the convergence of the reflected light from the deeper layer in the D1 direction is closer to the anamorphic lens 110 than the focal line position (S2) determined by the convergence of the reflected light from the target layer in the D2 direction.

Similarly, with regard to reflected light from a shallower layer than the target layer with respect to the laser light incident plane, the focal line position (M21) determined by the convergence in the D1 direction is more distant from the anamorphic lens 110 than the focal line position (M22) determined by the convergence in the D2 direction. In addition, the anamorphic lens 110 is designed such that the focal line position (M22) determined by the convergence of the reflected light from the shallower layer in the D2 direction is more distant from the anamorphic lens 110 than the focal line position (S1) determined by the convergence of the reflected light from the target layer in the D1 direction.

The spectral element 111 is interposed between the focal line position (M11) of the reflected light from the deeper layer in the D1 direction and the focal line position (S2) of the reflected light from the target layer in the D2 direction. In addition, the incident plane of the photodetector 112 is located at the focal line position (S0) of the reflected light from the target layer.

Referring to FIG. 2C, the spectral element 111 is formed of a transparent body in which a light output plane is flat and a light incident plane is inclined in two regions in different directions. As illustrated, the incident plane of the spectral element 111 has two inclines 111a and 111b. A boundary between the inclines 111a and 111b forms a straight line parallel to the D1 direction.

Referring to FIG. 2D, as seen from the spectral element 111 on the light incident side, traveling directions of the reflected light entered into the inclines 111a and 111b are turned into directions of Va and Vb by the action of diffraction of the spectral element 111, respectively, which are parallel to the D2 direction and are separated from each other. As illustrated, the reflected light (signal light) from the target layer has a light flux narrowed in the D2 direction as compared with the D1 direction.

Figure 3A:
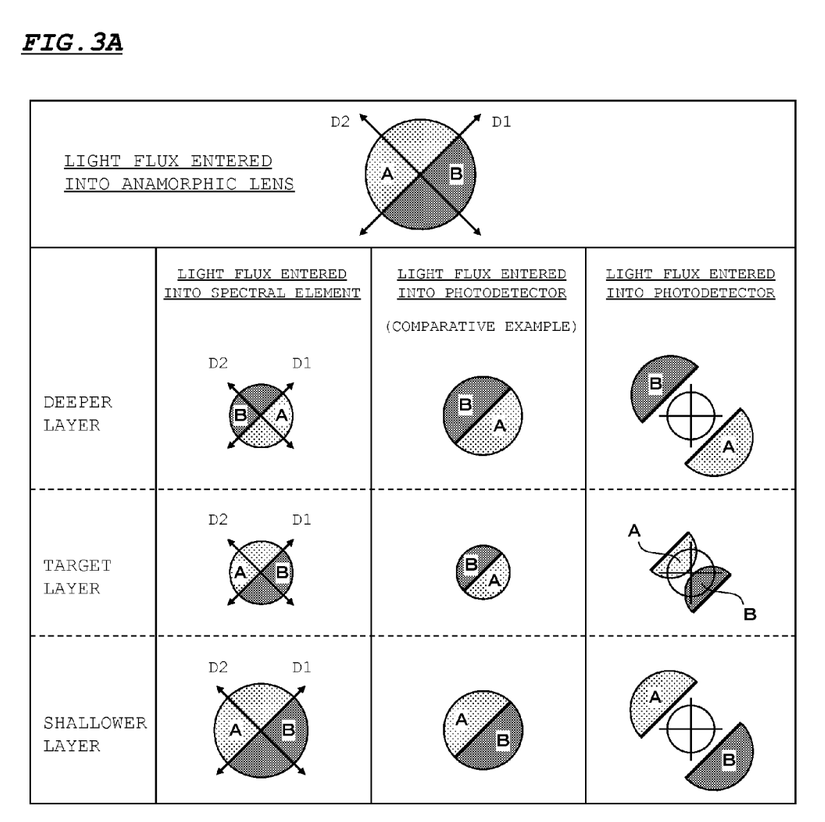
FIG. 3A is a diagram schematically showing states of light fluxes at the anamorphic lens, the spectral element, and the photodetector, in the embodiment.

FIG. 3A schematically shows states of light fluxes at the anamorphic lens 110, the spectral element 111, and the photodetector 112. Here, the light flux of the reflected light entered into the anamorphic lens 110 is split in two along a straight line parallel to the D1 direction, and a light flux in an upper left region and a light flux in a lower right region are designated as A light flux and B light flux, respectively, as shown in FIG. 3A. In addition, FIG. 3A shows which regions the A and B light fluxes are guided to by the spectral element 111 and the photodetector 112.

Referring to FIG. 3A and FIG. 2A for light convergence status, light fluxes at each of the positions will be described below.

First, the light fluxes of the reflected light entered into the spectral element 111 will be described below.

After having passed through the anamorphic lens 110, the reflected light from a deeper layer is converged first in the D2 direction and then in the D1 direction to form focal lines before incidence into the spectral element 111. That is, the focal lines at that time are elongated in the D1 and D2 directions, respectively. Accordingly, after having passed through the focal line M12 in FIG. 2A, A and B light fluxes are firstly reversed about a straight line parallel to the D1 direction as an axis of symmetry, and the light flux in the upper left region becomes B light flux and the light flux in the lower right region A light flux. Then, these light fluxes pass through the focal line M11 shown in FIG. 2A, and then are reversed about a straight line parallel to the D2 direction as an axis of symmetry. At that time, the A and B light fluxes are reversed about the straight line parallel to the D2 direction as an axis of symmetry in the upper left region and lower right region, respectively, and thus enter into the upper left region and the lower right region, respectively, as before passing through the focal line M11. Accordingly, at incidence into the spectral element 111, the light flux in the upper left region is B light flux and the light flux in the lower right region is A light flux.

After having passed through the anamorphic lens 110, the reflected light from the target layer does not form any focal line in the D1 or D2 direction prior to incidence into the spectral element 111. Accordingly, at the incidence into the spectral element 111, the light flux in the upper left region is A light flux and the light flux in the lower right region is B light flux, as in the case of the incidence into the anamorphic lens 111.

After having passed through the anamorphic lens 110, the reflected light from a shallower layer does not form any focal line in the D1 or D2 direction prior to incidence into the spectral element 111, as with the reflected light from the target layer. Accordingly, at incidence into the spectral element 111, the light flux in the upper left region is A light flux and the light flux in the lower right region is B light flux, as at the incidence into the anamorphic lens 111.

Here, for a better understanding of the functionality and operation of the spectral element 111, a description will be first provided as to in what states the light fluxes from the deeper layer, the target layer, and the shallower layer enter into the photodetector 112 in the case where the spectral element 111 is not disposed (comparative example).

Firstly, after having passed through the location of the spectral element 111, the reflected light from the deeper layer does not form any focal line in the D1 or D2 direction prior to incidence into the photodetector 112. Accordingly, at incidence into the photodetector 112, the light flux in the upper left region is B light flux and the light flux in the lower right region is A light flux, as when passing through the location of the spectral element 111.

After having passed through the location of the spectral element 111, the reflected light from the target layer forms a focal line in the D2 direction but does not form a focal line in the D1 direction prior to incidence into the photodetector 112. Accordingly, the A and B light fluxes incident on the spectral element 111 pass through the location of the spectral element 111 and then are reversed about a straight line parallel to the D1 direction as an axis of symmetry. Therefore, at incidence into the photodetector 112, the light flux in the upper left region is B light flux and the light flux in the lower right region is A light flux, as shown in FIG. 3A.

After having passed through the location of the spectral element 111, the reflected light from the shallower layer does not form any focal line in the D1 or D2 direction prior to incidence into the photodetector 112. Accordingly, at incidence into the photodetector 112, the light flux in the upper left region is A light flux and the light flux in the lower right region is B light flux, as when passing through the location of the spectral element 111.

As stated above, in the case where the spectral element 111 is not disposed, the light fluxes from the deeper layer, the target layer, and the shallower layer enter into the photodetector 112 in the states shown in FIG. 3A, middle boxes on lower side.

Next, a description will be provided as to incidence of light fluxes from the deeper layer, the target layer, and the shallower layer on the photodetector 112 in the case where the spectral element 111 is disposed.

In this case, at incidence into the spectral element 111, traveling directions of light fluxes in the upper left region and the lower right region are turned by the spectroscopic action of the spectral element 111 into upper left-hand and lower right-hand directions, respectively. Accordingly, at incidence into the photodetector 112, the light flux in the upper left region at incidence into the spectral element 111 is shifted in the upper left-hand direction, and the light flux in the lower right region at incidence into the spectral element 111 is shifted in the lower right-hand direction, with respect to the states of the light fluxes in the comparative example.

Figure 3B:
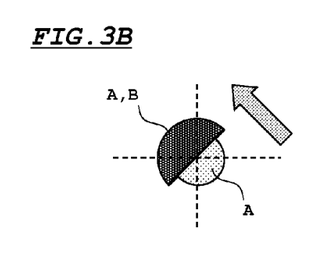
FIGS. 3B to 3D are diagrams showing states of the light fluxes and describing effects provided by the spectral element.

In this case, the B light flux from the deeper layer and the A light fluxes from the target and shallower layers enter into the upper left region of the spectral element 111. Accordingly, among the light fluxes entered into the photodetector 112 in the comparative example, the B light flux from the deeper layer and the A light fluxes from the target and shallower layers are shifted in the upper left-hand direction by the action of the upper left region of the spectral element 111, as shown in FIG. 3B.

Figure 3C:
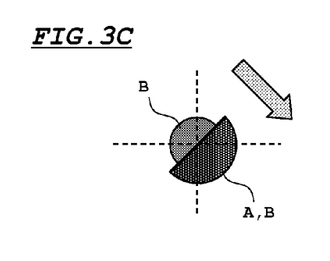

In addition, the A light flux from the deeper layer and the B light fluxes from the target and shallower layers enter into the lower right region of the spectral element 111. Accordingly, among the light fluxes entered into the photodetector 112 in the comparative example, the A light flux from the deeper layer and the B light fluxes from the target and shallower layers are shifted in the lower right-hand direction by the action of the lower right region of the spectral element 111.

Figure 3D:
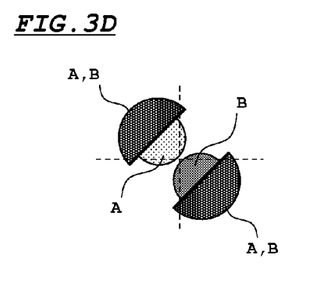

Accordingly, the states of the light fluxes on the photodetector 112 are as shown in FIG. 3D. The A and B light fluxes from the deeper layer, the target layer, and the shallower layer enter into the photodetector 112 in the states shown in FIG. 3A, the right boxes on the lower side.

By the foregoing actions of the spectral element 111, the central region of the photodetector 112 receives only the reflected light (A and B light fluxes) from the target layer, and does not receive the reflected light from the recording layers (the deeper and shallower layers) other than the target layer, as shown in FIG. 3A, the right boxes on the lower side.

In this case, the spectral element 111 is configured to turn the traveling directions of the light fluxes to an extent that the A and B light fluxes from the target layer do not overlap each other, as shown in FIG. 3A.

FIG. 4A shows a sensor pattern (astigmatic method/1-beam push-pull method) disposed on a light-receiving plane of a conventional photodetector in the case where the spectral element 111 is not disposed. FIG. 4B shows a sensor pattern (astigmatic method/1-beam push-pull method) disposed on a light-receiving plane of the photodetector 112 in this embodiment.

In each of FIGS. 4A and 4B, sensors P1 to P8 are disposed on the light-receiving plane of the photodetector. In addition, regions shown by dashed lines in the sensors refer to light flux regions of reflected light (signal light) from the target layer, and alphabetical letters "a" to "h" denote light flux regions of reflected light from the target layer entered into the sensors P1 to P8. Elongated regions shown by dotted lines in the sensors refer to light flux regions of reflected light from the target layer in the cases where a focal position of the reflected light set by the objective lens 109 is shifted from the target layer toward the inner and front sides.

With reference to FIG. 4A, assuming that, if a conventional photodetector is used, components of detection signals are designated as "A" to "H" in accordance with light intensities of the light flux regions "a" to "h", a direction of a track image is vertical in the diagram. Therefore, a focus error signal FE is determined by calculation of FE=(A+B+C+H)−(D+E+F+G), and a push-pull signal PP is determined by calculation of PP=(A+D+E+H)−(B+C+F+G).

In this embodiment, reflected light from the target layer is guided in the state shown in FIG. 3A, the right box on the lower side, to the photodetector 112. Therefore, the reflected light from the target layer can be received by disposing the sensor pattern shown in FIG. 4B in regions to which only the reflected light from the target layer is guided. Accordingly, only the reflected light (signal light) from the target layer enters into the sensor pattern. In this case, light in the light flux regions "a" to "h" is received by the respective corresponding sensors as shown in FIG. 4B. As a result, the focus error signal and the push-pull signal PP can be obtained by performing the same calculations as in the case of FIG. 4A where the conventional photodetector is used.

According to this embodiment as stated above, reflected light (stray light) from recording layer(s) other than the target layer does not enter into the sensor pattern disposed on the photodetector 112, and only reflected light (signal light) from the target layer enters into the same. Therefore, high-accuracy signals under no influence of stray light can be obtained from signals output by the sensors in the sensor pattern disposed on the light-receiving plane of the photodetector 112.

In the foregoing embodiment, the spectral element 111 is located between the focal line position (M11) of the reflected light from the deeper layer in the D1 direction and the focal line position (S2) of the reflected light from the target layer in the D2 direction. Alternatively, the spectral element 111 may be located between the focal line position (M12) of the reflected light from the deeper layer in the D2 direction and the focal line position (M11) in the D1 direction.

In this case, with regard to relations between the spectral element 111 and the focal lines, there are variations only in a relation between the spectral element 111 and the focal line of the reflected light from the deeper layer. Accordingly, the states of the reflected light from the target and shallower layers at incidence into the spectral element 111 and the photodetector 112 are the same as those in the foregoing case. In addition, the state of the reflected light from the deeper layer is also the same as that in the foregoing case as described below.

In this case, after having passed through the anamorphic lens 110, the reflected light from the deeper layer forms a focal line in the D2 direction but does not form a focal line in the D1 direction prior to incidence into the spectral element 111. Accordingly, the light fluxes entered into the anamorphic lens 110 are reversed about a straight line parallel to the D1 direction as an axis of symmetry. Therefore, at incidence into the spectral element 111, the light flux in the upper left region is B light flux and the light flux in the lower right region is A light flux, as in the foregoing case (refer to FIG. 3A).

In addition, after having passed through the spectral element 111, the reflected light from the deeper layer forms a focal line in the D1 direction but does not form a focal line in the D2 direction prior to incidence into the photodetector 112. At that time, the B and A light fluxes entered into the spectral element 111 are reversed in their respective regions about a straight line parallel to the D2 direction as an axis of symmetry. Accordingly, at incidence into the photodetector 112, the light flux in the upper left region is B light flux and the light flux in the lower right region is A light flux as in the foregoing case.

As stated above, even if the spectral element 111 is located between the focal lines M11 and M12, the states of the light fluxes entered into the photodetector 112 are the same as in the foregoing case. Therefore, the same advantage as described above can be obtained by disposing the sensor pattern in FIG. 4B at the central portion of the photodetector 112.

Experiment of this Embodiment

Next, results of the experiment performed by the inventor of the subject application will be used to describe that only reflected light (signal light) from the target layer enters into a sensor pattern on the photodetector 112.

Figures 5A, 5B:
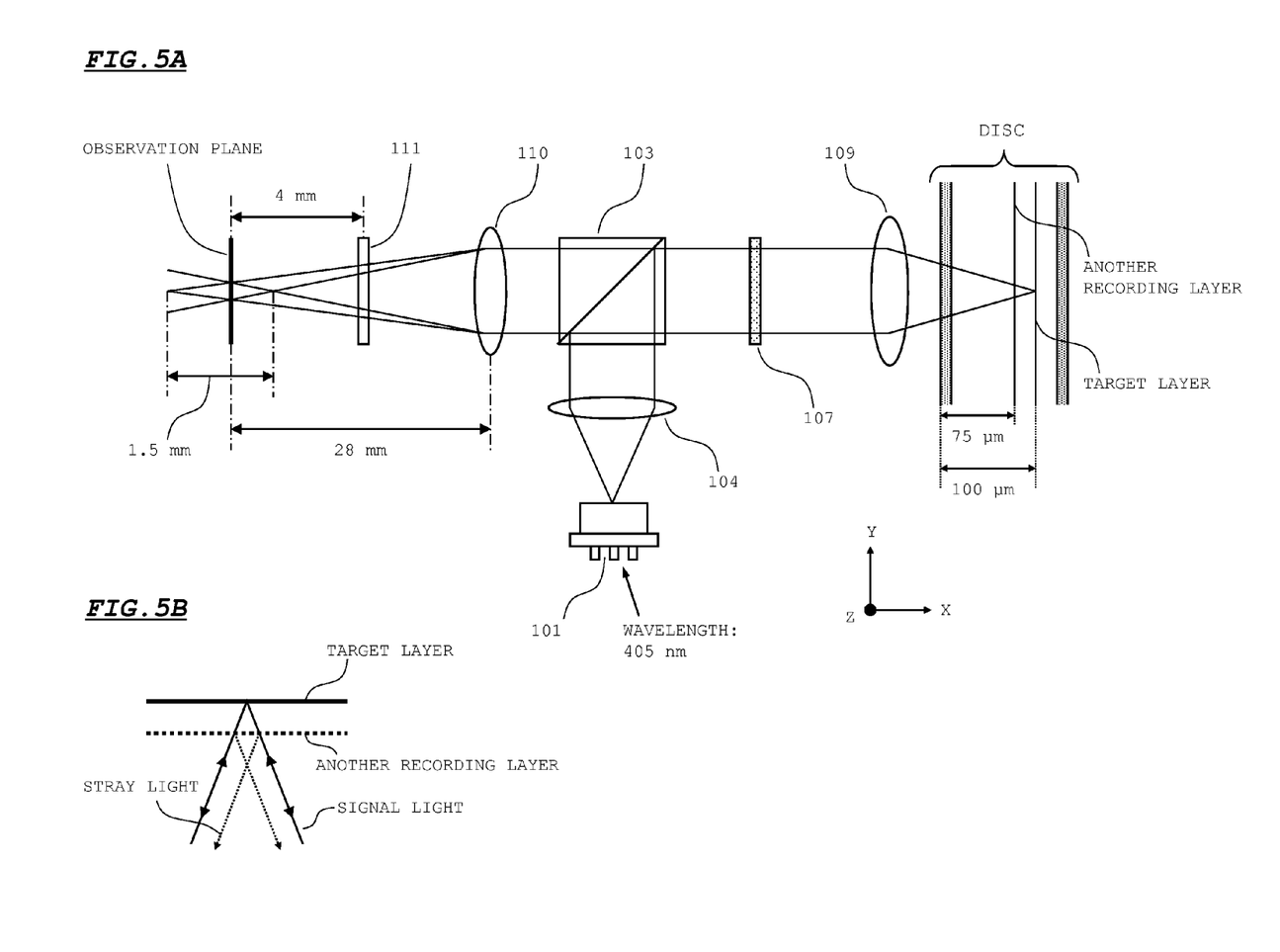
FIG. 5A is a diagram showing an optical system used for an experiment with the embodiment.
FIG. 5B is a diagram for describing states of reflected light (signal light) from a target layer and reflected light (stray light) from a recording layer other than the target layer in this experiment.

FIG. 5A shows an optical system used for the experiment of this embodiment. This experiment was carried out under the assumption that there was only one recording layer other than the target layer on the front side. In addition, an observation plane is provided at the position of the photodetector 112, in place of the photodetector 112. In FIG. 5A, the optical components identical to those shown in FIG. 1 are given the same reference numerals as those in FIG. 1.

The following are conditions for setting of the optical system in this experiment:

(1) Wavelength of the semiconductor laser 101: 405 nm
(2) Focal length of the objective lens 109: 1.4 mm
(3) Focal length of the collimator lens 104: 14 mm
(4) Focal length (inter-focal line center) of the anamorphic lens 110: 28 mm
(5) Focal line interval of the anamorphic lens 110: 1.5 mm
(6) Distance between the spectral element 111 and the observation plane: 4 mm
(7) Target layer: with a cover thickness of 100 μm (8) Recording layer other than the target layer: with a cover thickness of 75 μm FIG. 5B describes the states of reflected light (signal light) from the target layer and reflected light (stray light) from the recording layer other than the target layer in this experiment. As shown in FIG. 5B, laser light is focused on the target layer and is reflected as signal light. At that time, part of the laser light also enters into the other recording layer and is reflected as stray light.

Figure 6A:
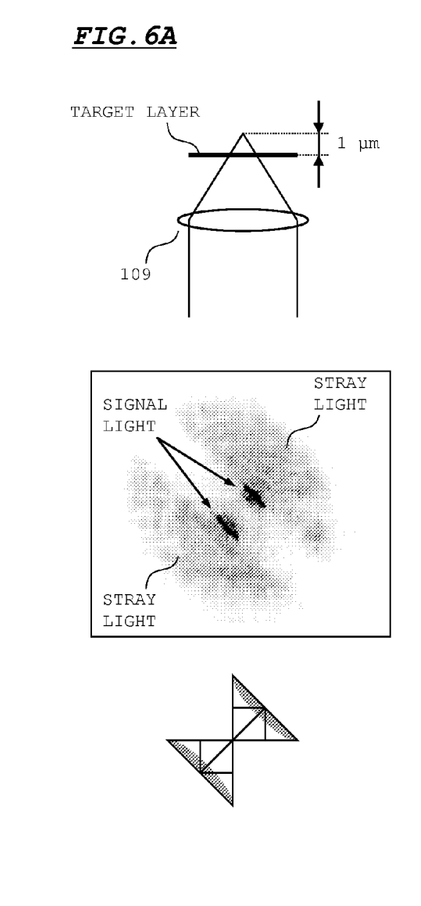
FIGS. 6A to 6C are diagrams showing results of the foregoing experiment and providing intensity distributions of the signal light and the stray light entered into an observation plane.
Figure 6B:
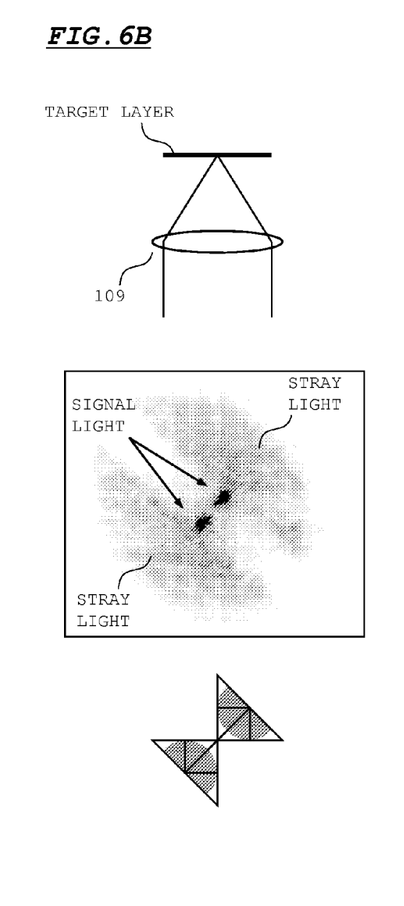
Figure 6C:
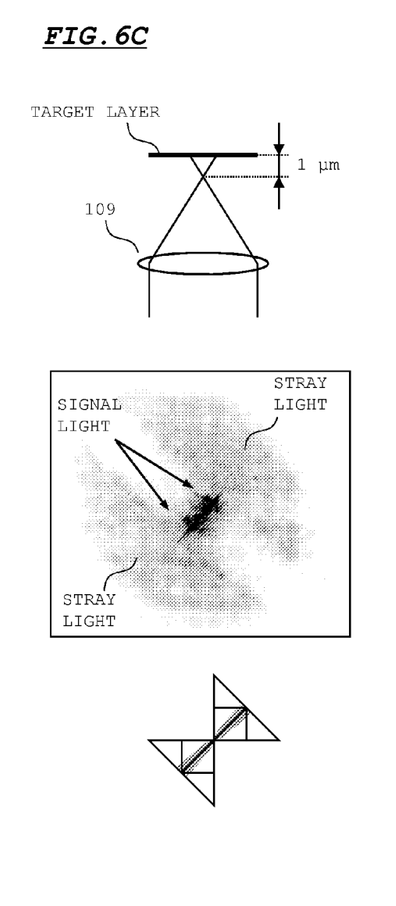

FIGS. 6A to 6C show intensity distributions of the signal light and the stray light entered into the observation plane in the experiment under the foregoing conditions. FIG. 6A corresponds to the case where the focal position of the reflected light set by the objective lens 109 is shifted by fpm from the target layer to the inner side; FIG. 6B the case where the focal position of the reflected light set by the objective lens 109 conforms to the target layer; and FIG. 6C the case where the focal position of the reflected light set by the objective lens 109 is shifted by fpm from the target layer to the front side. In each of FIGS. 6A, 6B, and 6C, the upper part shows the focal position of the reflected light set by the objective lens 109, the middle part shows, by shading, the intensity distribution of the reflected light entered into the observation plane, and the lower part schematically shows the intensity distribution of the reflected light in the sensor pattern region on the observation plane.

In this experiment, a curvature radius of the anamorphic lens 110 is set smaller in the D1 direction than in the D2 direction, whereas in the optical system of FIG. 1, the same is set smaller in the D2 direction than in the D1 direction. Accordingly, as shown in the lower parts of FIGS. 6A, 6B, and 6C, the sensor pattern is disposed symmetrically about a straight line as an axis that passes through the center of the sensor pattern and is parallel to the direction of the track image, unlike in the case of FIG. 4B.

Referring to each of the middle parts in FIGS. 6A, 6B, and 6C, the intensity distribution of the reflected light has particularly dense (darker) portions near the center that correspond to regions only the reflected light (signal light) from the target layer enters. The portions other than the foregoing ones correspond to regions the reflected light (stray light) from the recording layer other than the target layer enters.

Accordingly, it is understood that, if the sensor pattern is disposed on the observation plane in accordance with the portions (near the center) with dense intensity distributions of the reflected light, the sensor pattern receives only the reflected light (signal light) from the target layer and does not receive the reflected light (stray light) from the recording layer other than the target layer, as shown in the bottom parts of FIGS. 6A, 6B, and 6C.

Method for Positioning the Photodetector and the Spectral Element

In the foregoing embodiment, the spectral element 111 and the photodetector 112 need to be positioned in such a manner that, among the reflected light entered into the spectral element 111 shown in FIGS. 2C and 2D, the reflected light (signal light) from the target layer enters properly into the sensors P1 to P8 in the sensor pattern of FIG. 4B disposed on the photodetector 112. This positioning can be carried out by a method described below, for example.

FIGS. 7A to 7D, 8A, and 8B describe a method for positioning the spectral element 111 and the photodetector 112.

Figure 7A:
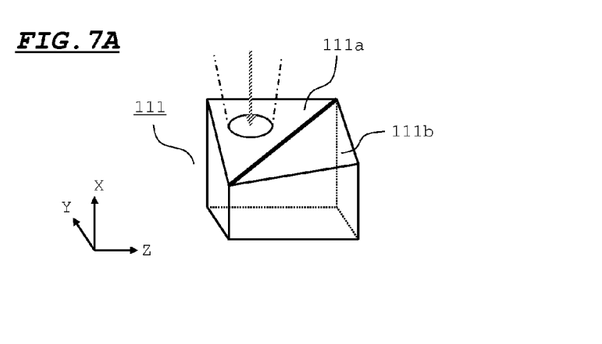
FIGS. 7A to 7D are diagrams showing methods of adjusting the spectral element and the photodetector, respectively, in the embodiment.

Referring to FIG. 7A, the inclines 111a and 111b of the spectral element 111 each has a width sufficient for accommodating the reflected light fluxes from the disc in the vicinity of the location of the spectral element 111. In addition, referring to FIGS. 7B and 7D, the photodetector 112 has another sensor pattern formed by sensors P5' to P8' on the upper left side of the foregoing sensor pattern, thereby to allow positioning of the photodetector 112 by the astigmatic method conventional.

When the spectral element 111 and the photodetector 112 are properly positioned, the reflected light fluxes entered into the incline 111a are guided to the sensors P1 to P4 and P5' to P8' on the photodetector 112.

For the positioning of the spectral element 111 and the photodetector 112, firstly, the spectral element 111 is roughly positioned and temporarily fixed such that the reflected light flux from the disc can fit into the incline 111a, as shown in FIG. 7A.

Figure 7B:
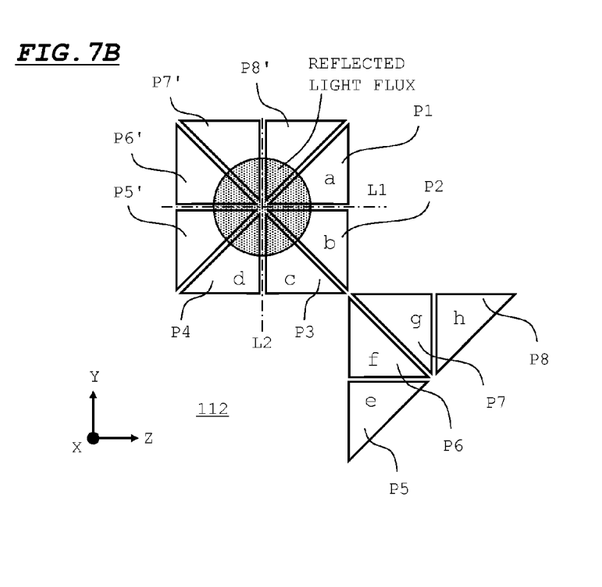

Here, since the sensor pattern of the sensors P5' to P8' is disposed on the upper left side of the sensor pattern for signal light detection as shown in FIG. 7B, the reflected light flux from the disc enters into the incline 111a corresponding to the sensors P1 to P4. Otherwise, if four sensors are disposed on the lower right side of the sensors P5 to P8 in the same manner as with the sensor pattern of P5' to P8', for example, the spectral element 111 is temporarily fixed such that the reflected light flux from the disc enters into the incline 111b corresponding to the sensors P5 to P8.

As shown in FIG. 7A, the reflected light flux from the disc, after incidence into the incline 111a, is not split by the spectral element 111 but is changed in traveling direction by the refractive action of the spectral element 111. Therefore, the reflected light flux having passed through the spectral element 111 forms an optical spot according to astigmatism on the light-receiving plane of the photodetector 112 under the optical action of the anamorphic lens 110. The optical spot is circular in a focused state and is oval in an unfocused state.

Next, in order for the photodetector 112 to properly detect the optical spot as shown in FIG. 7B, output signals from the sensors P1 to P4 and P5' to P8' are used to make position adjustment to the photodetector 112 by an adjustment method according to the conventional astigmatic method, thereby to fix the photodetector 112 at a proper position. In this case, the position adjustment of the photodetector 112 is carried out in accordance with detection signals from four sensor regions partitioned by parting lines L1 and L2. Accordingly, a center of gravity of the light flux can be aligned with a target position of the photodetector 112.

Figure 8A:
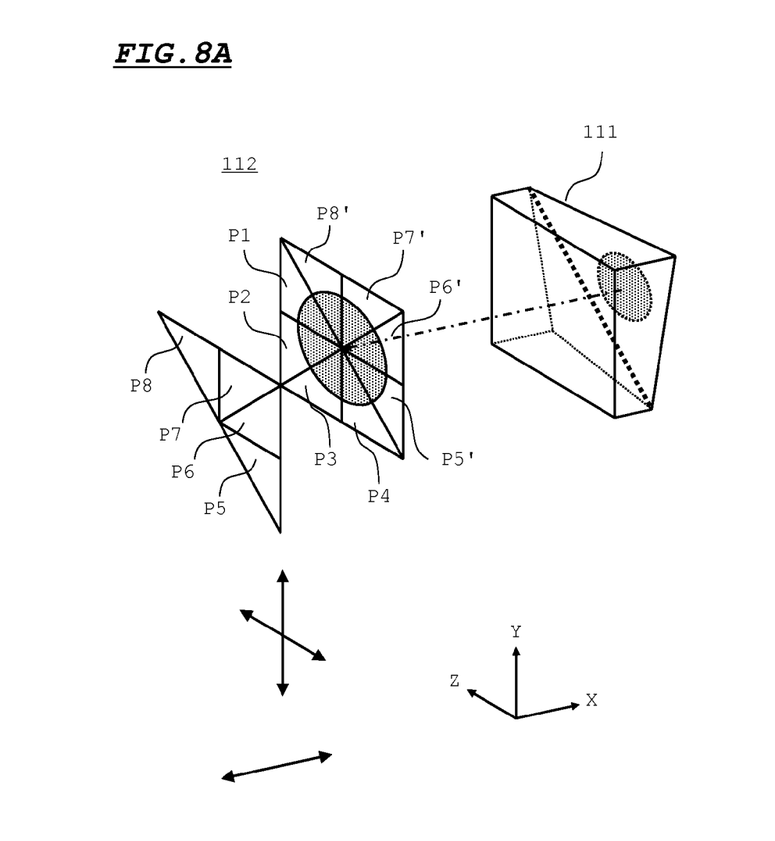
FIGS. 8A and 8B are diagrams showing methods of adjusting the spectral element and the photodetector, respectively, in the embodiment.

FIG. 8A is a perspective view of the spectral element 111 and the photodetector 112 in this case. As shown in FIG. 8A, the photodetector 112 is positioned in a Y-X plane in a direction of an X axis (a direction of an optical axis of the reflected light).

Figure 7C:
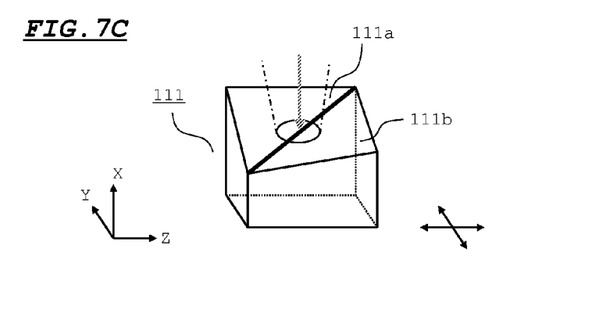
Figure 7D:
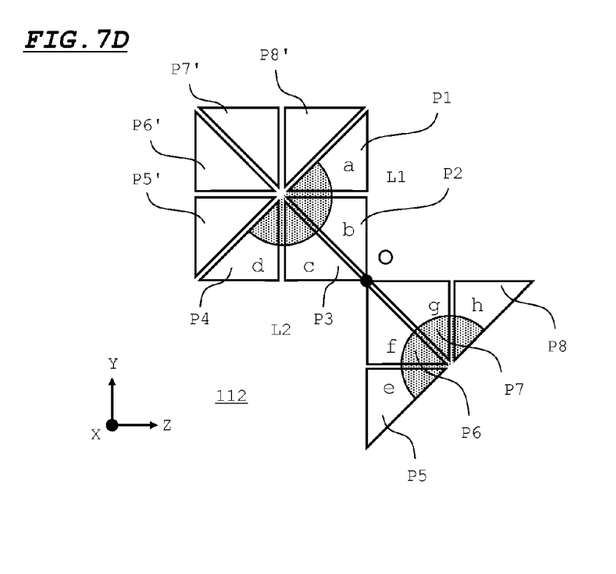

After the photodetector 112 has been positioned as stated above, position adjustment is made to the temporarily fixed spectral element 111. The spectral element 111 is moved into a plane vertical to the optical axis as shown in FIG. 7C, and the spectral element 111 is fixed at a position where detection signals from the sensors P1 to P8 on the photodetector 112 are equal to one another as shown in FIG. 7D. Accordingly, a central point O of the sensors P1 to P8 can be accurately aligned with the center of gravity of the reflected light flux.

Figure 8B:
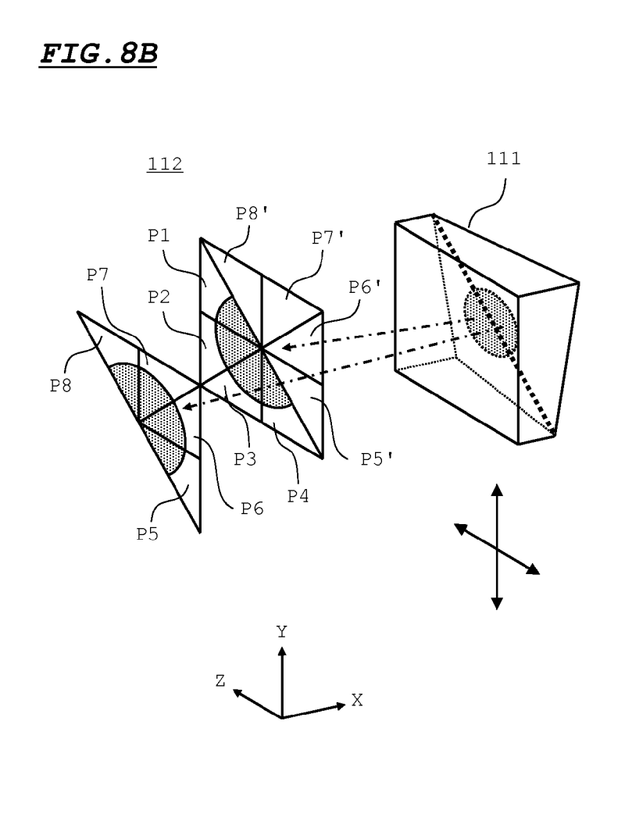

FIG. 8B is a perspective view of the spectral element 111 and the photodetector 112 in this case. As shown in FIG. 8B, the spectral element 111 is positioned in a Y-Z plane.

Accordingly, both the spectral element 111 and the photodetector 112 can be fixed at appropriate positions.

MODIFIED EXAMPLE 1

In the foregoing embodiment, the reflected light having passed through the anamorphic lens 110 is split by the spectral element 111 in two different traveling directions. In this modified example, a spectral element 120 is used in place of the spectral element 111.

Figure 9A:
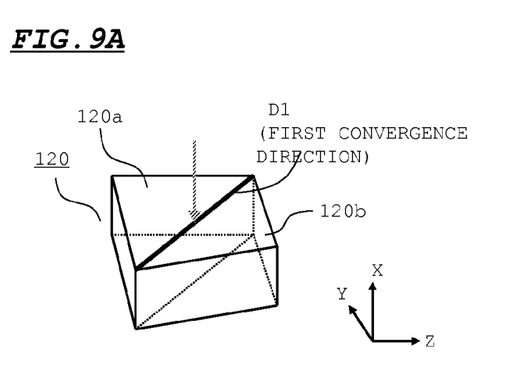
FIGS. 9A to 9C are diagrams showing a spectral element in Modified Example 1.

FIG. 9A is a perspective view of a shape of the spectral element 120. The spectral element 120 is formed of a transparent body in which a light incident plane and a light output plane are individually inclined in two regions in different directions. As shown in FIG. 9A, the spectral element 120 has on the incident plane two inclines 120a and 120b. A boundary between the inclines 120a and 120b forms a straight line parallel to the D1 direction. In addition, the inclines 120a and 120b of the spectral element 120 each has a width sufficient for accommodating the reflected light fluxes from the disc in the vicinity of the location of the spectral element 120.

Figure 9B:
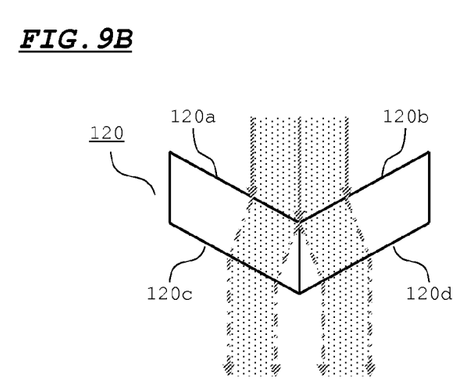

FIG. 9B is a diagram of the spectral element 120 as seen from the lateral direction (vertical to the X axis and forming an angle of 45 degrees on both Y and Z axes). As shown in FIG. 9B, the output plane of the spectral element 120 has two inclines 120c and 120d. In addition, a boundary between the inclines 120c and 120d constitutes a straight line parallel to the D1 direction as in the case with the incident plane. The light entered into the spectral element 120 is subjected to a refractive action on the inclines 120a and 120b and then further subjected to a refractive action on the inclines 120c and 120d. Accordingly, the light passing through the spectral element 120 is not changed in traveling direction between the instant of entering and the instant of being emitted, and is split after being emitted.

Figure 9C:
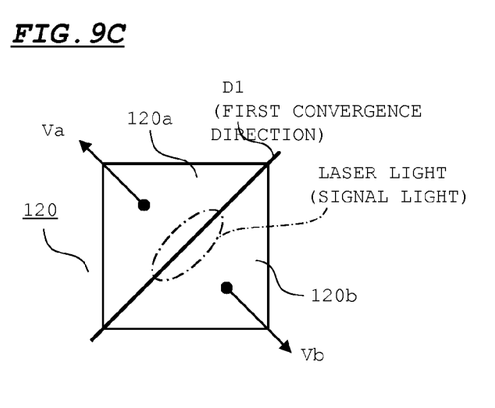

FIG. 9C shows the spectral element 120 as seen from the light incident side. A traveling direction of the reflected light entered into the spectral element 120 is turned into directions Va and Vb that are parallel to the D2 direction and are separated from each other, as in the case of the spectral element 111 in the foregoing embodiment.

Consequently, only the reflected light (signal light) from the target layer can be received by the sensor pattern disposed on the photodetector 112, as in the foregoing embodiment. In this case, the photodetector 112 and the spectral element 120 can also be positioned by the same position adjustment method as that in the foregoing embodiment. Further, in this case, the spectral functionality of the spectral element 120 is adjusted such that the A and B light fluxes from the target layer do not overlap with each other on the light-receiving plane of the photodetector 112, as in the foregoing embodiment.

MODIFIED EXAMPLE 2

In the foregoing embodiment, the reflected light having passed through the anamorphic lens 110 is split by the spectral element 111 in two different traveling directions. In this modified example, a hologram element 130 is used in place of the spectral element 111, and a quadrant sensor is disposed on a center of the sensor pattern.

Figure 10A:
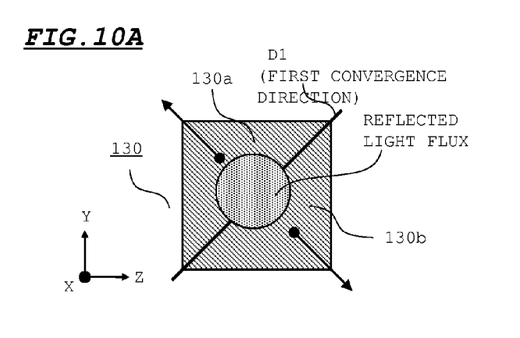
FIGS. 10A to 10D are diagrams for describing methods of adjusting a spectral element and a photodetector in Modified Example 2.
Figure 10B:
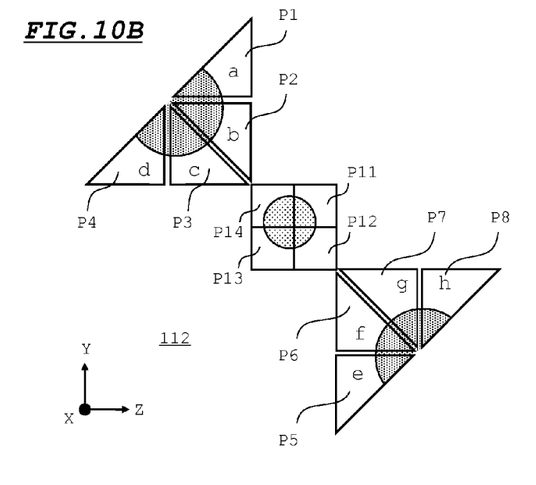
Figure 10C:
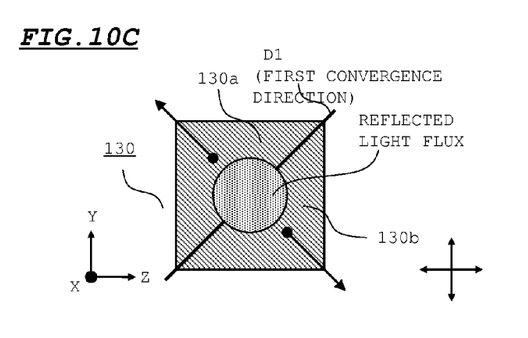

FIGS. 10A and 10C show the hologram element 130 as seen from the light incident side. An incident plane of the hologram element 130 has two hologram regions 130a and 130b with a straight line parallel to the D1 direction as a boundary therebetween.

A diffraction pattern is disposed in the hologram region 130a and 130b such that a traveling direction of the incident reflected light is turned to the Va and Vb directions that are parallel to the D2 direction and are separated from each other. In addition to the effect of turning the traveling direction of the reflected light, a diffraction pattern is set in the hologram regions 130a and 130b such that 0-order diffracted light is generated by an amount according to predetermined diffraction efficiency. It is not necessarily required that the hologram regions 130a and 130b are wide enough for accommodating the reflected light fluxes in the vicinity of the location of the hologram element 130.

Figure 10D:
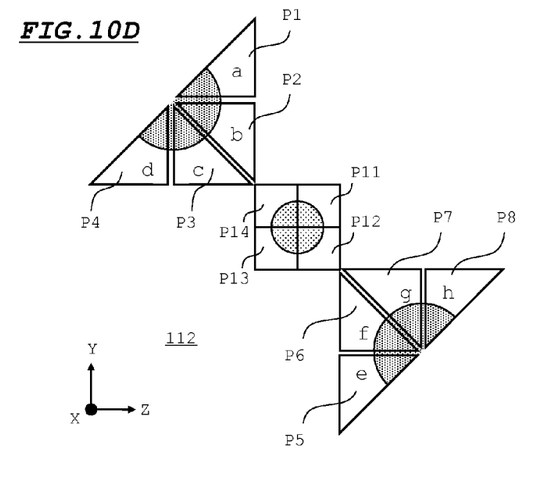

FIGS. 10B and 10D show the sensor pattern disposed on the photodetector 112 used in this modified example. As illustrated, the quadrant sensor is arranged on the center of the sensor pattern. Specifically, the photodetector 112 has the same sensor pattern as in the foregoing embodiment and also has sensors P11 to P14 (the quadrant sensor) in accordance with the conventional astigmatic method at the middle of the sensors P1 to P8. In this case, the reflected light traveling in the direction turned by the hologram element 130 enters into the sensors P1 to P8, and the reflected light traveling in the direction not turned by the hologram element 130 (0-order diffracted light) enters into the sensors P11 to P14.

Accordingly, only the reflected light (signal light) from the target layer can be received by the sensor pattern disposed on the photodetector 112, as in the foregoing embodiment.

Next, a method for positioning the photodetector 112 and the hologram element 130 in this modified example will be described below.

Firstly, as shown in FIG. 10A, the hologram element 130 is temporarily fixed at a position where the reflected light flux from the disc enters at an almost center thereof. Subsequently, position adjustment is made to the photodetector 112 by an adjustment method according to the conventional astigmatic method using output signals from the sensors P11 to P14 such that the 0-order diffracted light is brought into the state as shown in FIG. 10B on the sensors P11 to P14. This allows the photodetector 112 to be fixed at an appropriate position. After that, as shown in FIG. 10C, the hologram element 130 is moved in a Y-Z plane, and then the hologram element 130 is fixed at a position where detection signals from the sensors P1 to P8 are equal to each other. Accordingly, signal light is equally distributed to the sensors P1 to P8, as shown in FIG. 10D. Therefore, both the hologram element 130 and the photodetector 112 can be positioned in an appropriate manner.

In this modified example, the 0-order diffracted light out of the reflected light enters into the sensors P11 to P14, and therefore a decreased amount of the reflected light enters into the sensors P1 to P8. In addition, out of the 0-order diffracted light, the reflected light (stray light) from the recording layer other than the target layer into enters the sensors P1 to P8. Accordingly, diffraction efficiencies of the hologram regions 130a and 130b may be set to reduce an amount of the O-order diffracted light to an an extent that position adjustment can be made by the sensors P11 to P14. This increases an amount of reflected light entered into the sensors P1 to P8 and decreases an amount of stray light applied to the sensors P1 to P8.

If the photodetector 112 and the hologram element 130 are positioned without using 0-order light by the same method as that shown in FIGS. 7A to 7D, it is desired that a blazed diffraction pattern is formed in the hologram regions 130a and 130b of the hologram element 130 to thereby lead to an increased amount of the reflected light to the sensors P1 to P8.

The foregoing descriptions are provided as to the embodiment and modified examples of the present invention. However, the present invention is not limited by the foregoing embodiment or the modified examples. In addition, the present invention can be embodied in various manners other than that described above.

Figure 11:
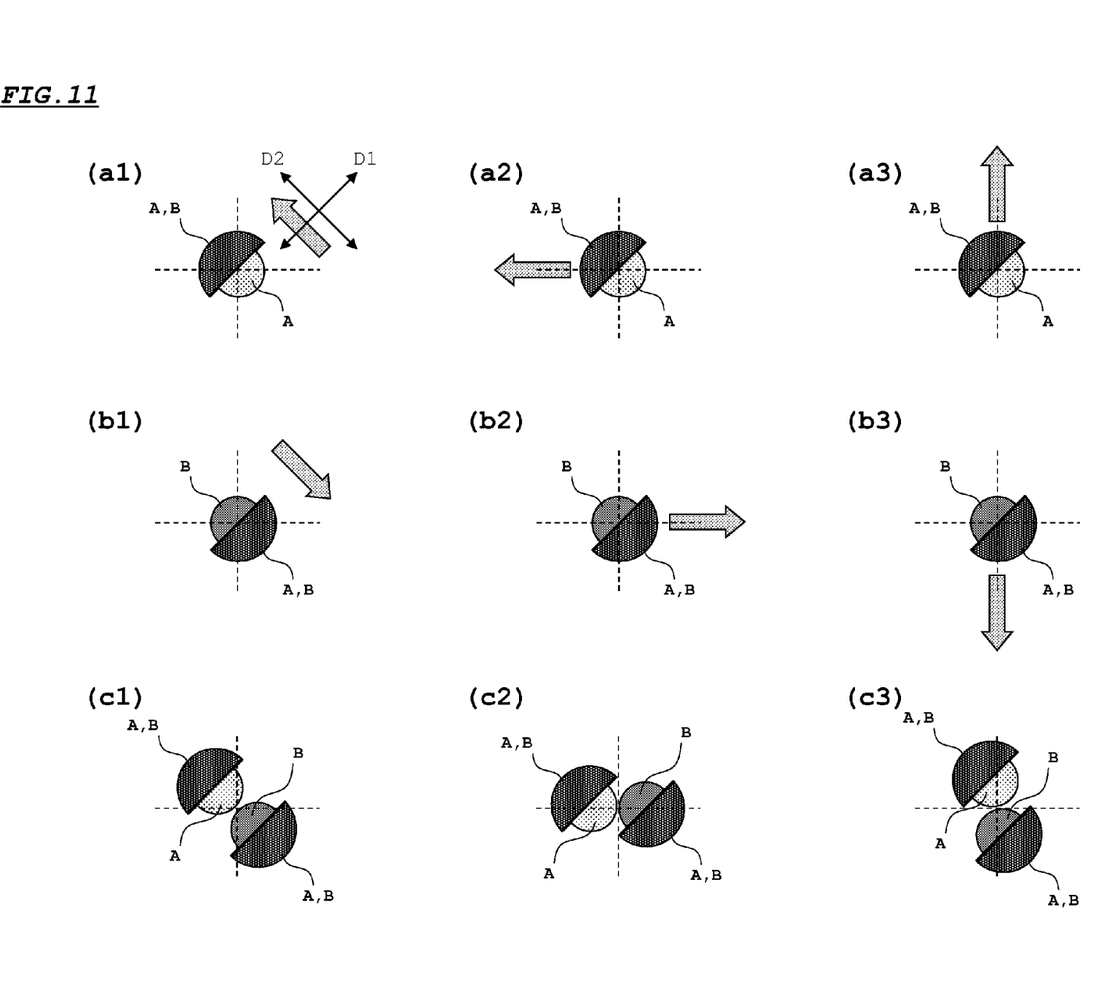
FIG. 11 is a diagram for describing other modified examples.

For example, in the foregoing embodiment and the modified examples, the traveling direction of the reflected light passing through the spectral element and the hologram element is turned into different directions that are parallel to the D2 direction and are separated from each other as shown in (a1) and (b1) of FIG. 11. Alternatively, the turned traveling directions may be as shown in (a2) and (b2) of FIG. 11, or may be as shown in (a3) and (b3) of FIG. 11, or may be parallel to the D1 direction. Alternatively, either of the incident planes in the spectral element and the hologram element may be configured so as not to turn the traveling direction of the incident light. In short, all required for the spectral element and the hologram element is to separate the A and B light fluxes from all the layers from each other such that the reflected light from the deeper and the reflected light from the shallower layers do not overlap the reflected light from the target layer, and that the A and B light fluxes from the target layer do not overlap each other, on the light-receiving plane of the photodetector 112.

In addition, the three light splitting modes shown in FIG. 11 are included in the disclosure of claim 2 "the spectral element separates two light fluxes split along the parallel straight line from each other in a direction vertical to the straight line."

Besides, embodiments of the present invention can be appropriately modified in various manners within the scope of technical ideas disclosed in the claims.

What is claimed is:

1. An optical pickup device for recording and/or reproducing information onto and/or from a disc having a plurality of recording layers in a direction of lamination, comprising:
   a laser light source;
   an objective lens for allowing light emitted from the laser light source to converge onto the disc;
   an astigmatic element for allowing the laser light reflected by the disc to converge in a first direction and form a first focal line at a first position and allowing the laser light to converge in a second direction and form a second focal line at a second position closer to the disc than the first position;
   a spectral element for splitting a flux of the laser light having passed through the astigmatic element in two along a straight line parallel to the first direction and separating traveling directions of split light fluxes from each other; and
   a photodetector for receiving the laser light having passed through the spectral element, wherein
   the spectral element is interposed between the second focal line of the laser light reflected from a target recording layer in the disc and the second focal line of the laser light reflected from a deeper recording layer than the target recording layer, and
   the photodetector is interposed between the first and second focal lines of the laser light reflected from the target recording layer.

2. The optical pickup device according to claim 1, wherein the spectral element separates two light fluxes split along the parallel straight line from each other in a direction vertical to the straight line.

3. The optical pickup device according to claim 1, wherein the spectral element has two planes differently inclined with a straight line parallel to the first direction as a boundary therebetween on an incident plane and/or an output plane.

4. The optical pickup device according to claim 2, wherein the spectral element has two planes differently inclined with a straight line parallel to the first direction as a boundary therebetween on the incident plane and/or the output plane.

5. The optical pickup device according to claim 1, wherein the spectral element has two diffraction regions in which different diffraction patterns are set with a straight line parallel to the first direction as a boundary therebetween on the incident plane or the output plane.

6. The optical pickup device according to claim 2, wherein the spectral element has two diffraction regions in which different diffraction patterns are set with a straight line parallel to the first direction as a boundary therebetween on the incident plane or the output plane.

* * * * *